United States Patent
Sun (10) Patent No.: US 9,674,345 B2
(45) Date of Patent: Jun. 6, 2017

(54) CALL IDENTIFYING METHOD AND APPARATUS

(71) Applicant: Huawei Technologies Co., Ltd., Shenzhen (CN)

(72) Inventor: Lianfeng Sun, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 41 days.

(21) Appl. No.: 14/749,249

(22) Filed: Jun. 24, 2015

(65) Prior Publication Data

US 2015/0296078 A1    Oct. 15, 2015

Related U.S. Application Data

(63) Continuation of application No. PCT/CN2013/082016, filed on Aug. 22, 2013.

(30) Foreign Application Priority Data

Dec. 24, 2012    (CN) .......................... 2012 1 0564452

(51) Int. Cl.
*H04M 3/42* (2006.01)
*H04L 29/06* (2006.01)
(Continued)

(52) U.S. Cl.
CPC ...... *H04M 3/42042* (2013.01); *H04L 65/104* (2013.01); *H04L 65/1006* (2013.01);
(Continued)

(58) Field of Classification Search
CPC .. H04M 3/42042; H04M 15/06; H04M 15/57; H04M 15/63; H04L 65/1006; H04L 65/1016; H04L 65/104; H04L 65/1069
See application file for complete search history.

(56) References Cited

U.S. PATENT DOCUMENTS

2007/0165612 A1* 7/2007 Buckley ............ H04L 29/12283
                                                      370/356
2008/0123625 A1* 5/2008 Buckley ................ H04M 7/123
                                                      370/352
(Continued)

FOREIGN PATENT DOCUMENTS

CN          101409627 A      4/2009
CN          101790147 A      7/2010
(Continued)

OTHER PUBLICATIONS

Rosenberg et al., "SIP: Session Initiation Protocol," Network Working Group, RFC: 3261, The Internet Society, Reston, Virginia (Jun. 2002).
(Continued)

*Primary Examiner* — Chi H Pham
*Assistant Examiner* — Weibin Huang
(74) *Attorney, Agent, or Firm* — Leydig, Voit & Mayer, Ltd.

(57) ABSTRACT

The present invention relates to a call identifying method and apparatus. The method includes: receiving an Invite message sent by an IMS network element, where the Invite message carries called identifying information; when a called terminal identified by the called identifying information is a CS network user, generating a CR parameter or a GCR parameter, and generating a CS call reference header field according to the CR parameter or the GCR parameter, and sending a response message to the IMS network element, where the message carries the CS call reference header field to identify a call corresponding to the Invite message. The present invention implements that cross-domain call association by using a unified call reference parameter identifier.

8 Claims, 4 Drawing Sheets

(51) Int. Cl.
 H04M 15/06 (2006.01)
 H04M 15/00 (2006.01)
(52) U.S. Cl.
 CPC ...... *H04L 65/1016* (2013.01); *H04L 65/1069* (2013.01); *H04M 15/06* (2013.01); *H04M 15/57* (2013.01); *H04M 15/63* (2013.01)

(56) References Cited

U.S. PATENT DOCUMENTS

| | | | | |
|---|---|---|---|---|
| 2008/0299980 | A1* | 12/2008 | Buckley | H04W 28/06 455/445 |
| 2012/0057569 | A1* | 3/2012 | Xie | H04W 36/0022 370/331 |

FOREIGN PATENT DOCUMENTS

| | | |
|---|---|---|
| CN | 103095689 A | 5/2013 |
| EP | 2254320 A1 | 11/2010 |
| EP | 2391057 A1 | 11/2011 |
| JP | H05308441 A | 11/1993 |
| JP | 2009212928 A | 9/2009 |
| WO | WO 2008069545 A1 | 6/2008 |

OTHER PUBLICATIONS

Garcia-Martin et al., "Private Header (P-Header) Extensions to the Session Initiation Protocol (SIP) for the 3$^{rd}$ Generation Partnership Project (3GPP)," Network Working Group, RFC: 3455, The Internet Society, Reston, Virginia (Jan. 2003).

* cited by examiner

CALL IDENTIFYING METHOD AND APPARATUS

CROSS-REFERENCE TO RELATED APPLICATIONS

This application is a continuation of International Patent Application No. PCT/CN2013/082016, filed on Aug. 22, 2013, which claims priority to Chinese Patent Application No. 201210564452.3, filed on Dec. 24, 2012, both of which are hereby incorporated by reference in their entireties.

TECHNICAL FIELD

The present invention relates to the communications field, and in particular, to a call identifying method and apparatus.

BACKGROUND

During implementation of interconnection between an IP multimedia subsystem (IP Multimedia Subsystem, IMS) network and a conventional circuit switched (Circuit Switched, CS) network, a media gateway control function (Media Gateway Control Function, MGCF) entity is required to implement mutual conversion between Session Initiation Protocol (Session Initiation Protocol, SIP) signaling and Integrated Services Digital Network User Part (Integrated Services Digital Network User Part, ISUP)/Bearer Independent Call Control (Bearer Independent Call Control, BICC) signaling.

In the prior art, in a CS network, a call reference parameter or a global call reference parameter may be used to identify a call, and the parameter may also be used to perform charging for the call; in an IMS network, a call identifier Call-ID parameter may be used to identify a call, and an icid parameter is used to perform charging for the call. However, a disadvantage of the prior art is that when a cross-domain call is made, cross-domain call association cannot be implemented because a parameter used to identify a call in the CS network is inconsistent with that used in the IMS network. In an actual application, because charging cannot be performed by using a unified call identifier, charging for a call becomes complex.

SUMMARY

Embodiments of the present invention provide a call identifying method and apparatus, so as to implement cross-domain call association by using a unified call reference parameter identifier.

According to a first aspect, an embodiment of the present invention provides a call identifying method, where the method includes:

receiving an Invite message sent by an IP multimedia subsystem IMS network element, where the Invite message carries called identifying information;

when a called terminal identified by the called identifying information is a circuit switched CS network user, generating a CS call reference CR parameter or global call reference GCR parameter, so as to include the CR parameter or the GCR parameter in an initial address message IAM to be sent to a CS network element; and generating a CS call reference header field according to the CR parameter or the GCR parameter, and sending a response message to the IMS network element, where the response message carries the CS call reference header field that is used to identify a call corresponding to the Invite message.

In a first possible implementation manner, when the Invite message carries 100Rel information, the sending a response message to the IMS network element is specifically: sending a 180/181/182/183/200 message to the IMS network element, where the 180/181/182/183/200 message carries the CS call reference header field; and when the Invite message does not carry the 100Rel information, the sending a response message to the IMS network element is specifically: after receiving an address complete message ACM sent by the CS network element, sending a 180 message to the IMS network element, where the 180 message carries the CS call reference header field; or after receiving an answer message ANM/CONNECT sent by the CS network element, sending a 200 message to the IMS network element, where the 200 message carries the CS call reference header field.

With reference to the first aspect, in a second possible implementation manner, the CS call reference header field further includes a protocol indication parameter, where the protocol indication parameter is used to indicate a protocol type used to define the CR parameter or the GCR parameter.

According to a second aspect, an embodiment of the present invention provides a call identifying method, where the method includes:

receiving an initial address message IAM sent by a circuit switched CS network element;

extracting a call reference CR parameter or a global call reference GCR parameter from the IAM, and generating a CS call reference header field according to the CR parameter or the GCR parameter; and sending an Invite message to an IP multimedia subsystem IMS network element, where the Invite message carries the CS call reference header field that is used to identify a call corresponding to the IAM.

In a first possible implementation manner, the CS call reference header field further includes a protocol indication parameter, where the protocol indication parameter is used to indicate a protocol type used to define the CR parameter or the GCR parameter.

According to a third aspect, an embodiment of the present invention provides a call identifying apparatus, where the apparatus includes:

a receiving unit, configured to: receive an Invite message sent by an IP multimedia subsystem IMS network element, where the Invite message carries called identifying information; and transmit the called identifying information to an identifying unit;

the identifying unit, configured to: receive the called identifying information transmitted by the receiving unit; when a called terminal identified by the called identifying information is a circuit switched CS network user, generate a CS call reference CR parameter or global call reference GCR parameter; and transmit the CR parameter or the GCR parameter to a sending unit and a response unit;

the sending unit, configured to receive the CR parameter or the GCR parameter sent by the identifying unit, and send an initial address message IAM to a CS network element, where the IAM includes the CR parameter or the GCR parameter generated by the identifying unit; and the response unit, configured to receive the CR parameter or the GCR parameter sent by the identifying unit, generate a CS call reference header field according to the CR parameter or the GCR parameter, and send a response message to the IMS network element, where the response message carries the CS call reference header field that is used to identify a call corresponding to the Invite message.

In a first possible implementation manner, when the Invite message carries 100Rel information, the response unit is specifically configured to: send a 180/181/182/183/200 message to the IMS network element, where the 180/181/182/183/200 message carries the CS call reference header field; and when the Invite message does not carry the 100Rel information, the response unit is specifically configured to: after receiving an address complete message ACM sent by the CS network element, send a 180 message to the IMS network element, where the 180 message carries the CS call reference header field; or after receiving an answer message ANM/CONNECT sent by the CS network element, send a 200 message to the IMS network element, where the 200 message carries the CS call reference header field.

With reference to the third aspect, in a second possible implementation manner, the CS call reference header field further includes a protocol indication parameter, where the protocol indication parameter is used to indicate a protocol type used to define the CR parameter or the GCR parameter.

According to a fourth aspect, an embodiment of the present invention provides a call identifying apparatus, where the apparatus includes:

a receiving unit, configured to receive an initial address message IAM sent by a circuit switched CS network element and transmit the IAM to a generating unit;

the generating unit, configured to receive the IAM sent by the receiving unit, extract a call reference CR parameter or a global call reference GCR parameter from the IAM, generate a CS call reference header field according to the CR parameter or the GCR parameter, and transmit the CS call reference header field to a sending unit; and the sending unit, configured to receive the CS call reference header field transmitted by the generating unit, and send an Invite message to an IP multimedia subsystem IMS network element, where the Invite message carries the CS call reference header field that is used to identify a call corresponding to the IAM.

In the embodiments of the present invention, when a user makes a cross-domain call between a CS network and an IMS network, a CS call reference header field is extended in a SIM message of the IMS network, and a unified call reference parameter can be used to identify the cross-domain call, thereby facilitating interconnection and interworking between different networks.

DESCRIPTION OF EMBODIMENTS

In the following description, to illustrate rather than limit, specific details such as a particular system structure, an interface, and a technology are provided to make a thorough understanding of the present invention. However, it should be understood by a person skilled in the art that the present invention can also be implemented in other embodiments without the specific details. In other cases, detailed descriptions of well known apparatuses, circuits and methods are omitted, so that the present invention is described without being disturbed by the unnecessary details.

Figure 1:
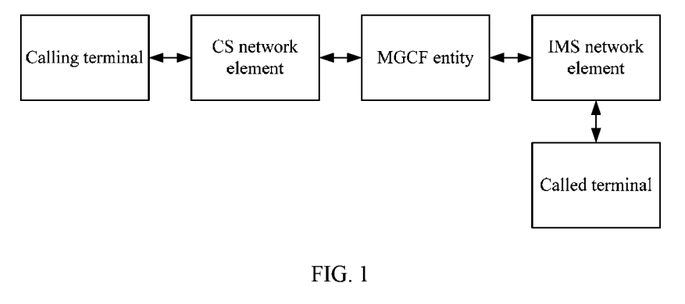
FIG. 1 is a schematic diagram of an application scenario of a call identifying method according to an embodiment of the present invention.

FIG. 1 is a schematic diagram of an application scenario of a call identifying method according to an embodiment of the present invention. As shown in FIG. 1, in an actual application, the call identifying method provided in this embodiment of the present invention, as a new call identifying method, may be applied to a scenario in which a calling terminal and a called terminal are located in different networks, for example, the calling terminal is located in a CS network and may be connected to a CS network element, and the called terminal is located in an IMS network and may be connected to an IMS network element. This embodiment of the present invention implements that, when the calling terminal calls the called terminal, and after a CS network element that receives a call signaling message of the calling terminal sends, to an MGCF entity, an initial address message (Initial address message, IAM) carrying a global call reference (Global Call Reference, GCR) parameter or a call reference (Call Reference, CR) parameter, the MGCF entity generates a CS call reference header field according to the GCR parameter or the CR parameter and sends, to the IMS network element, an Invite message carrying the CS call reference header field. Because the CS call reference header field carries the corresponding GCR parameter or CR parameter, the GCR parameter or the CR parameter can be used to uniformly identify the cross-domain call. In addition, the scenario in which the calling terminal and the called terminal are located in different networks may also be that the calling terminal is located in an IMS network and the called terminal is located in a CS network.

Figure 2:
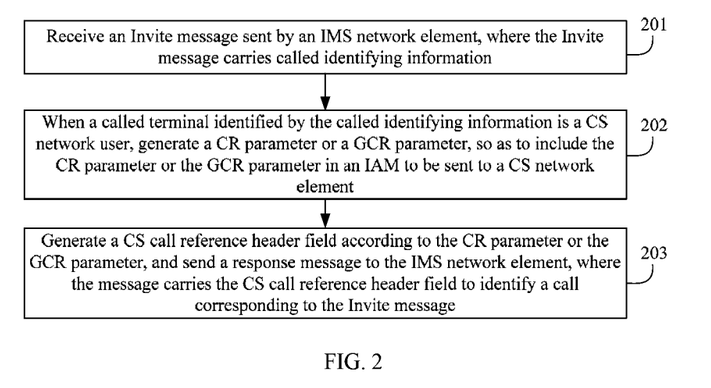
FIG. 2 is a flowchart of a call identifying method according to an embodiment of the present invention.

FIG. 2 is a flowchart of a call identifying method according to an embodiment of the present invention. As shown in FIG. 2, this embodiment is executed by an MGCF entity, where a method for identifying a call by the MGCF entity after receiving an Invite message sent by an IMS network element is described in detail. A scenario corresponding to this embodiment is that a calling terminal is located in an IMS network and a called terminal is located in a CS network. As shown in FIG. 2, this embodiment includes the following steps:

Step 201: Receive an Invite message sent by an IMS network element, where the Invite message carries called identifying information.

In this embodiment of the present invention, the IMS network element is defined synoptically and used to indicate a network element that performs signaling interaction with the MGCF entity. For example, the IMS network element that sends the Invite message to the MGCF entity is a breakout gateway control function (Breakout Gateway Control Function, BGCF) entity. The BGCF entity is a part of the IMS network, mainly implements a call routing function, and is used to select a network that is connected to an entry point of a CS domain.

When a calling terminal initiates a voice call request to a called terminal, a corresponding network device, for example, an IMS access network element, may receive a signaling message and send the signaling message to the IMS network element. After receiving a call signaling message corresponding to the calling terminal, the IMS network element extracts called identifying information of the called terminal from the call signaling message.

After extracting the called identifying information of the called terminal from the call signaling message sent by a calling terminal and determining that the called terminal corresponding to the called identifying information is a CS user terminal, the IMS network element may send the Invite message to the MGCF. The Invite message carries the called identifying information, calling identifying information, and call identifying information. The call identifying information is an identifier Call-ID that is used in the IMS network and used to identify a session in the SIP protocol.

Step 202: When a called terminal identified by the called identifying information is a circuit switched CS network user, generate a CS call reference CR parameter or global call reference GCR parameter, so as to include the CR parameter or the GCR parameter in an initial address message IAM to be sent to a CS network element.

After receiving the Invite message, the MGCF entity performs routing according to the called identifying information, generates the GCR parameter or the CR parameter, and includes the CR parameter or the GCR parameter in the IAM to be sent to the CS network element, so as to instruct a CS network side to use the CR parameter or the GCR parameter to identify the call.

Specifically, the MGCF entity selects a to-be-used CR parameter or GCR parameter according to an outgoing signaling type. To implement the technical solution of the present invention, the MGCF entity needs to store a configuration information table, which stores a mapping relationship between an outgoing signaling type and a to-be-used CR parameter or GCR parameter. By querying configuration information in the configuration information table, the MGCF entity may determine whether the generated CS call reference header field carries a CR parameter or a GCR parameter. Specifically, When the CS network side uses BICC (Bearer Independent Call Control, Bearer Independent Call Control) signaling, the MGCF needs to query corresponding configuration information, so as to select to use the GCR parameter or the CR parameter; when the CS network side uses ITU-T ISUP (International Telecommunication Union Integrated Services Digital Network User Part, International Telecommunication Union ISDN User Part) signaling and ANSI ISUP (American National Standards Institute Integrated Services Digital Network User Part, American National Standards Institute ISDN User Part) signaling, the CR parameter is used to identify a call.

Step 203: Generate a CS call reference header field according to the CR parameter or the GCR parameter, and send a response message to the IMS network element, where the response message carries the CS call reference header field that is used to identify a call corresponding to the Invite message.

Specifically, a SIP message is used for information interaction between the MGCF entity and the IMS network element. To enable the IMS network element to use call identifying information same as that of a CS network side to identify the call, the MGCF entity may include the CR parameter or the GCR parameter in the response message to be returned to the IMS network element, where the response message may be a 180/181/182/183/200 message. It should be noted that the response message sent herein is not a response message specially sent for sending a CS call reference header field; instead, the CS reference header field is included in a response message existing in the prior art.

One CS call reference header field may be generated according to the CR parameter or the GCR parameter, and a format of the CS call reference header field may be as follows:

CS-Call-Reference: gcr=xxxxxxx; cr=yyyyyyy; crf=zzzzzzz;

where gcr is a GCR parameter, xxxxxxx is content of the GCR parameter, and a length of the content is equivalent to a character length of the content of the GCR parameter in a CS network; cr is a CR parameter, yyyyyyy is content of the CR parameter, and a length of the content is equivalent to a character length of the content of the CR parameter in the CS network; and crf is a protocol indication parameter, and zzzzzzz is a value of crf, which may be BICC, ITUISUP, or ANSIISUP.

In the CS call reference header field, the parameter crf is optional.

Certainly, a new header field may not be extended in a SIP message; instead, an existing header field of the SIP message carries the CR parameter or the GCR parameter.

Preferably, the following uses that the CS call reference header field carries the CR parameter or the GCR parameter as an example for description.

Whether the CS call reference header field specifically carries the CR parameter or the GCR parameter is determined according to the outgoing signaling type. If the CS network side uses the CR parameter, the CS call reference header field carries the CR parameter; and if the CS network side uses the GCR parameter, the CS call reference header field carries the GCR parameter.

After the CS call reference header field is generated, the MGCF may include the CS call reference header field in the response message, where the CS call reference header field is used to identify a call corresponding to the call signaling message.

Specifically, if the Invite message sent by the IMS network element to the MGCF entity carries a 100Rel parameter, the MGCF needs to send, to the IMS network element, a 180/181/182/183/200 message that carries media information allocated by the MGCF, where the 180/181/182/183/200 message may carry the CS call reference header field. If the Invite message sent by the IMS network element to the MGCF entity does not carry the 100Rel parameter, after receiving an address complete message (Address Complete Message, ACM) sent by the CS network element, the MGCF entity may send a 180 message to the IMS network element and include the CS call reference header field in the 180 message; or after receiving an answer message (Answer Message, ANM; Connect Message) sent by the CS network element, send a 200 message to the IMS network element, where the 200 message carries the CS call reference header field.

In a case in which the MGCF does not support 100Rel, the 180 message may not carry the CS call reference header field, and therefore the 200 message needs to carry the CS call reference header field. Optionally, only the 180 message may carry the CS call reference header field, and the 200 message does not carry the CS call reference header field. Therefore, after receiving the response message returned by the MGCF entity, the IMS network element may record and store the CR parameter or the GCR parameter of the CS call reference header field as identifying information for identifying the call, thereby implementing that a call reference parameter consistent with that of the CS network side is used to identify a cross-domain call and facilitating interconnection and interworking between different networks.

In this embodiment of the present invention, an MGCF entity receives an Invite message sent by an IP multimedia subsystem IMS network element, where the Invite message carries called identifying information; when a called terminal identified by the called identifying information is a circuit switched CS network user, the MGCF entity generates a CS call reference CR parameter or global call reference GCR parameter, so as to include the CR parameter or the GCR parameter in an initial address message IAM to be sent to a CS network element; and the MGCF entity generates a CS call reference header field according to the CR parameter or the GCR parameter, so as to include the CS call reference header field in a response message to be sent to the IMS network element, so that the IMS network element uses the CR parameter or the GCR parameter in the CS call reference header field to identify a call corresponding to the Invite message. Therefore, the IMS network element can use a CR parameter or GCR parameter consistent with that of a CS network side to identify a cross-domain call, thereby facilitating interconnection and interworking between different networks; and subsequently, when charging is performed for the call, call charging can be performed by using the unified call reference parameter, thereby simplifying a cross-domain call charging method.

Figure 3:
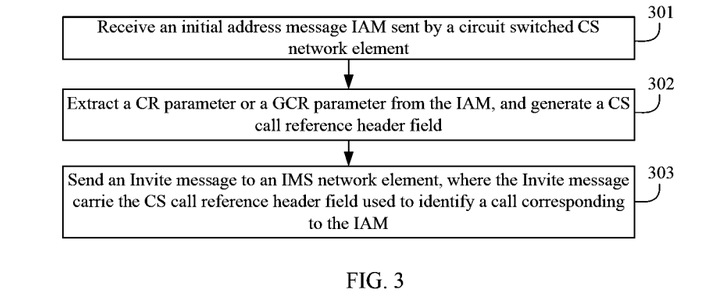
FIG. 3 is a flowchart of another call identifying method according to an embodiment of the present invention.

The foregoing embodiment describes a method for performing cross-domain call association by an MGCF entity in a scenario in which a calling terminal is located in an IMS network and a called terminal is located in a CS network. The following embodiment describes a method for performing cross-domain call association in a scenario in which a calling terminal is located in a CS network and a called terminal is in an IMS network. FIG. 3 is a flowchart of another call identifying method according to an embodiment of the present invention. This embodiment is executed by an MGCF entity, and as shown in FIG. 3, this embodiment includes the following steps:

Step 301: Receive an initial address message IAM sent by a CS network element.

When a calling terminal in a CS network initiates a call to a called terminal located in an IMS network, a corresponding network device, for example, the CS network element, may receive a signaling message; after receiving the signaling message, the CS network element determines, according to called identifying information carried in the signaling message, that the called terminal is located in the IMS network, and sends the IAM to the MGCF entity, where the message carries a call reference CR parameter or a global call reference GCR parameter that is used to identify the call.

Step 302: Extract a call reference CR parameter or a global call reference GCR parameter from the IAM, and generate a CS call reference header field according to the CR parameter or the GCR parameter.

After extracting the CR parameter or the GCR parameter from the IAM, the MGCF entity may generate the CS call reference header field according to the parameter.

Specifically, a format of the CS call reference header field may be as follows:

CS-Call-Reference: gcr=xxxxxxx; cr=yyyyyyy; crf=zzzzzzz;

where gcr is a GCR parameter, xxxxxxx is content of the GCR parameter, and a length of the content is equivalent to a character length of GCR content in a CS network; cr is a CR parameter, yyyyyyy is content of the CR parameter, and a length of the content is equivalent to a character length of the content of the CR parameter in the CS network; and crf is a protocol indication parameter, and zzzzzzz is a value of crf, which may be BICC, ITUISUP, or ANSIISUP.

In the CS call reference header field, the parameter crf is optional.

Certainly, a new header field may not be extended in a SIP message; instead, an existing header field of the SIP message carries the CR parameter or the GCR parameter.

Preferably, the following uses that the CS call reference header field carries the CR parameter or the GCR parameter as an example for description.

Whether the CS call reference header field specifically carries the CR parameter or the GCR parameter is determined according to an outgoing signaling type. If a CS network side uses the CR parameter, the CS call reference header field carries the CR parameter; and if the CS network side uses the GCR parameter, the CS call reference header field carries the GCR parameter.

Specifically, to implement the technical solution of the present invention, the MGCF entity may store a configuration information table, which stores a mapping relationship between an outgoing signaling type and a to-be-used CR parameter or GCR parameter. By querying configuration information in the configuration information table, the MGCF entity may determine whether the generated CS call header field carries a CR parameter or a GCR parameter. Certainly, when a CS network side uses BICC signaling, the MGCF needs to query corresponding configuration information, so as to select to use the GCR parameter or the CR parameter; and when the CS network side uses ITU-T ISUP signaling and ANSI ISUP signaling, the CR parameter is used to identify a call.

Step 303: Send an Invite message to an IP multimedia subsystem IMS network element, where the Invite message carries the CS call reference header field that is used to identify a call corresponding to the IAM.

After the CS call reference header field is generated, the MGCF may include the CS call reference header field in the Invite message to be sent to the IMS network element, where the CS call reference header field is used to identify the call corresponding to the IAM.

Therefore, after receiving the Invite message sent by the MGCF entity, the IMS network element may record and store the CR parameter or the GCR parameter of the CS call reference header field as identifying information for identifying the call, thereby implementing that a call reference parameter consistent with that of the CS network side is used to identify a cross-domain call and facilitating interconnection and interworking between different networks.

In this embodiment of the present invention, an MGCF entity receives an IAM sent by a CS network element; extracts a call reference CR parameter or a global call reference GCR parameter from the IAM and generates a CS call reference header field according to the CR parameter or the GCR parameter; and sends an Invite message to an IP multimedia subsystem IMS network element, where the Invite message carries the CS call reference header field that is used to identify a call corresponding to the IAM. Therefore, the IMS network element can use a call reference parameter consistent with that of a CS network side to identify a cross-domain call, thereby facilitating interconnection and interworking between different networks; and subsequently, when charging is performed for the call, call charging can be performed by using the unified call reference parameter, thereby simplifying a cross-domain call charging method.

In the foregoing embodiment, the MGCF can generate the CS call reference header field according to the called identifying information carried in the Invite message to be sent to the IMS network element and indicate, by using a response message returned to the IMS network element, a CR or GCR parameter used by the IMS network element to identify a call.

In the following embodiment, the IMS network element may generate one CS call reference header field, and then include the CS call reference header field in a message to be sent to the MGCF entity; the MGCF entity generates a new CS call reference header field according to the CS call reference header field and signaling of the CS network side, and include the new call reference header field in the response message to be returned to the IMS network element; therefore, so as to instruct the IMS network element to use a call reference parameter consistent with that of the CS network side to identify a cross-domain call.

Figure 4:
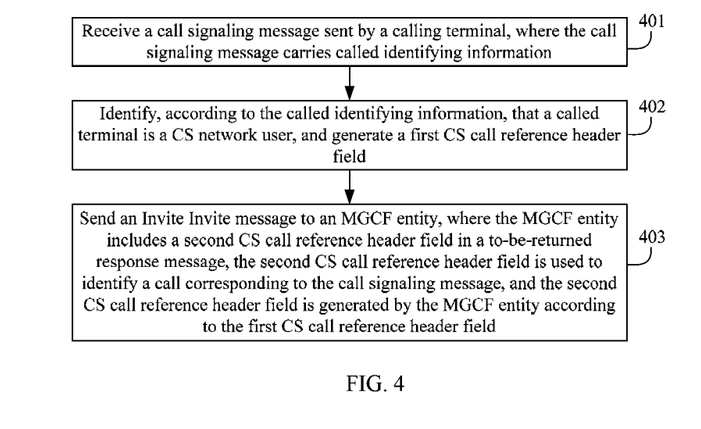
FIG. 4 is a flowchart of another call identifying method according to an embodiment of the present invention.

FIG. 4 is a flowchart of another call identifying method according to an embodiment of the present invention. This embodiment is executed by an IMS network element, where a method for identifying a cross-domain call by the IMS network element after receiving a call signaling message sent by a calling terminal is described in detail. As shown in FIG. 4, this embodiment includes the following steps:

Step 401: Receive a call signaling message sent by a calling terminal, where the call signaling message carries called identifying information.

Step 402: Identify, according to the called identifying information, that a called terminal identified by the called identifying information is a circuit switched CS network user, and generate a first CS call reference header field.

After receiving the call signaling message sent by the calling terminal, the IMS network element extracts the called identifying information from the call signaling message and may generate one CS call reference header field after determining, according to the called identifying information, that the called terminal is a CS user terminal.

A format of the CS call reference header field may be as follows:
CS-Call-Reference: gcr=xxxxxxx; cr=yyyyyyy; crf=zzzzzzz;

where gcr is a GCR parameter, xxxxxxx is content of the GCR parameter, and a length of the content is equivalent to a character length of GCR content in a CS network; cr is a CR parameter, yyyyyyy is content of the CR parameter, and a length of the content is equivalent to a character length of the content of the CR parameter in the CS network; and crf is a protocol indication parameter, and zzzzzzz is a value of crf, which may be BICC, ITUISUP, or ANSIISUP.

In the CS call reference header field, the parameter crf is optional.

Certainly, a new header field may not be extended in a SIP message; instead, an existing header field of the SIP message carries the CR parameter or the GCR parameter.

Preferably, the following uses that the CS call reference header field carries the CR parameter or the GCR parameter as an example for description.

Whether the CS call reference header field specifically carries the CR parameter or the GCR parameter is determined according to an outgoing signaling type. If a CS network side uses the CR parameter, the CS call reference header field carries the CR parameter; and if the CS network side uses the GCR parameter, the CS call reference header field carries the GCR parameter.

Step 403: Send an Invite message to a media gateway control function MGCF entity, where the MGCF entity includes a second CS call reference header field in a to-be-returned response message, the second CS call reference header field is used to identify a call corresponding to the call signaling message, and the second CS call reference header field is generated by the MGCF entity according to the first CS call reference header field and configuration information.

After generating the first CS call reference header field, the IMS network element may include the first CS call reference header field in the Invite message to be sent to the MGCF entity, so that the MGCF entity generates the second CS call reference header field according to the first CS call reference header field after receiving the Invite message. Specifically, the first CS call reference header field may carry both the GCR parameter and the CR parameter. However, in an IAM to be sent to a CS network element, a GCR parameter or a CR parameter of a specified type is selected according to a protocol used on a CS network side, and the second CS call reference header field is generated according to a to-be-used GCR parameter or CR parameter. When the response message is returned to the IMS network element, the response message may carry the second CS call reference header field, so that the IMS network element learns identifying information used by the CS network side in the call.

Specifically, the MGCF entity determines, according to the outgoing signaling type, whether the CR parameter or the GCR parameter is used in the second CS call reference header field. To implement the technical solution of the present invention, the MGCF entity needs to store a configuration information table, which stores a mapping relationship between an outgoing signaling type and a to-be-used CR parameter or GCR parameter. By querying configuration information in the configuration information table, the MGCF entity may determine whether the generated CS call header field carries a CR parameter or a GCR parameter. Certainly, when the CS network side uses BICC signaling, the MGCF needs to query corresponding configuration information, so as to select to use the GCR parameter or the CR parameter; and when the CS network side uses ITU-T ISUP signaling and ANSI ISUP signaling, the CR parameter is used to identify a call.

In this embodiment of the present invention, an IMS network element receives a call signaling message sent by a calling terminal, where the call signaling message carries called identifying information; identifies, according to the called identifying information, that a called terminal identified by the called identifying information is a circuit switched CS network user, and generates a first CS call reference header field; and sends an Invite message to a media gateway control function MGCF entity, so that the MGCF entity carries a second CS call reference header field in a to-be-returned response message, the second CS call reference header field is used to identify a call corresponding to the call signaling message, and the second CS call reference header field is generated by the MGCF entity according to the first CS call reference header field and configuration information. Therefore, the IMS network element can use a call reference parameter consistent with that of a CS network side to identify a cross-domain call, thereby facilitating interconnection and interworking between different networks; and subsequently, when charging is performed for the call, call charging can be performed by using the unified call reference parameter, thereby simplifying a cross-domain call charging method.

The foregoing embodiment describes a process in which the IMS network element generates the first CS call reference header field and includes the first CS call reference header field in the Invite message to be sent to the MGCF entity. The following embodiment describes a method in which the MGCF entity generates, after receiving the Invite message that carries the first CS call reference header field, the second CS call reference header field according to the first CS call reference header field and implements cross-domain call association.

Figure 5:
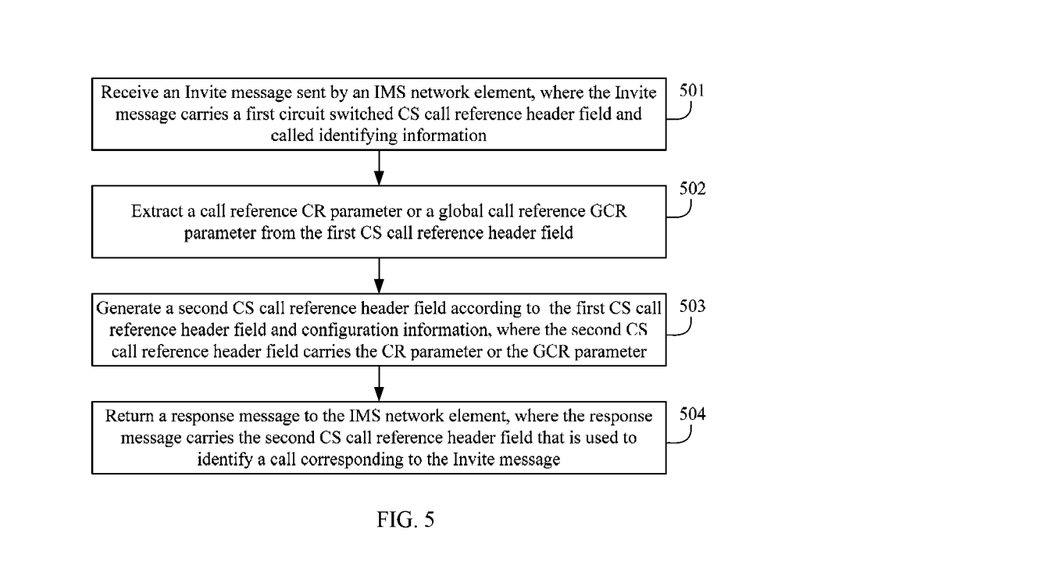
FIG. 5 is a flowchart of another call identifying method according to an embodiment of the present invention.

FIG. 5 is a flowchart of another call identifying method according to an embodiment of the present invention. This embodiment is executed by an MGCF entity, where a method for performing cross-domain call association by the MGCF entity after receiving an Invite message sent by an IMS network element is described in detail. As shown in FIG. 5, this embodiment includes the following steps:

Step 501: Receive an Invite message sent by an IP multimedia subsystem IMS network element, where the Invite message carries a first circuit switched CS call reference header field.

When a calling terminal initiates a voice call request to a called terminal, a corresponding network device, for example, an IMS access network element, may receive a signaling message and send the signaling message to the IMS network element. After receiving a call signaling message corresponding to the calling terminal, the IMS network element extracts called identifying information of the called terminal from the call signaling message.

After extracting the called identifying information of the called terminal from the call signaling message sent by a calling terminal and determining that the called terminal corresponding to the called identifying information is a CS user terminal, the IMS network element may send the Invite message to an MGCF. The Invite message carries the called identifying information and includes a first CS call reference header field. The first CS call reference header field is generated by the IMS network element according to the called identifying information.

A format of the first CS call reference header field may be as follows:
CS-Call-Reference: gcr=xxxxxxx; cr=yyyyyyy; crf=zzzzzzz;

where gcr is a GCR parameter, xxxxxxx is content of the GCR parameter, and a length of the content is equivalent to a character length of GCR content in a CS network; cr is a CR parameter, yyyyyyy is content of the CR parameter, and a length of the content is equivalent to a character length of the content of the CR parameter in the CS network; and crf is a protocol indication parameter, and zzzzzzz is a value of crf, which may be BICC, ITUISUP, or ANSIISUP.

In the CS call reference header field, the parameter crf is optional.

Certainly, a new header field may not be extended in a SIP message; instead, an existing header field of the SIP message carries the CR parameter or the GCR parameter.

Step 502: Extract a call reference CR parameter and/or a global call reference GCR parameter from the first CS call reference header field.

Step 503: Generate a second CS call reference header field according to the first CS call reference header field and configuration information, where the second CS call reference header field carries the CR parameter or the GCR parameter.

The first CS call reference header field may include both the GCR parameter and the CR parameter. However, in an IAM sent by the MGCF entity to a CS network element, only a GCR parameter or a CR parameter of a specified type may be used according to a protocol used on a CS network side. Therefore, the second CS call reference header field may be generated according to a to-be-used GCR parameter or CR parameter.

Specifically, the MGCF entity determines, according to an outgoing signaling type, whether the CR parameter or the GCR parameter is used in the second CS call reference header field. To implement the technical solution of the present invention, the MGCF entity needs to store a configuration information table, which stores a mapping relationship between an outgoing signaling type and a to-be-used CR parameter or GCR parameter. By querying configuration information in the configuration information table, the MGCF entity may determine whether the generated CS call header field carries a CR parameter or a GCR parameter. Certainly, when the CS network side uses BICC signaling, the MGCF needs to query corresponding configuration information, so as to select to use the GCR parameter or the CR parameter; and when the CS network side uses ITU-T ISUP signaling and ANSI ISUP signaling, the CR parameter is used to identify a call.

Step 504: Return a response message to the IMS network element, where the response message carries the second CS call reference header field that is used to identify a call corresponding to the Invite message.

After the second CS call reference header field is generated, the MGCF may include the second CS call reference header field in the response message to be returned to the IMS network element, where the second CS call reference header field is used to identify a call corresponding to the call signaling message.

Specifically, when the Invite message carries 100Rel information, the returning a response message to the IMS network element is: sending a 180/181/182/183/200 message to the IMS network element, where the 180/181/182/183/200 message carries the second CS call reference header field; and when the Invite message does not carry the 100Rel information, the returning a response message to the IMS network element is: after receiving an address complete message ACM sent by the CS network element, sending a 180 message to the IMS network element, where the 180 message carries the second CS call reference header field; or after receiving an answer message ANM/CONNECT sent by the CS network element, sending a 200 message to the IMS network element, where the 200 message carries the second CS call reference header field.

In a case in which the MGCF does not support 100Rel, the 180 message may not carry the second CS call reference header field, and therefore the 200 message needs to carry the second CS call reference header field. Optionally, as an unconventional option, only the 180 message may carry the second CS call reference header field, and the 200 message does not carry the CS call reference header field.

Therefore, after receiving the response message returned by the MGCF entity, the IMS network element can use a call reference parameter consistent with that of a CS network side to identify a cross-domain call, thereby facilitating interconnection and interworking between different networks; and subsequently, when charging is performed for the call, call charging can be performed by using the unified call reference parameter, thereby simplifying a cross-domain call charging method.

In this embodiment of the present invention, an MGCF entity receives an Invite message sent by an IP multimedia subsystem IMS network element, where the Invite message carries a first circuit switched CS call reference header field and called identifying information; extracts a call reference CR parameter and/or a global call reference GCR parameter from the first CS call reference header field; generates a second CS call reference header field according to a protocol type used by a CS network side, where the second CS call reference header field carries the CR parameter or the GCR parameter; and returns a response message to the IMS network element, where the response message carries the second CS call reference header field that is used to identify a call corresponding to a call signaling message. Therefore, this implements that a unified call reference parameter is used to identify a cross-domain call, and call charging can be performed by using the unified call reference parameter, thereby simplifying a cross-domain call charging method.

Figure 6:
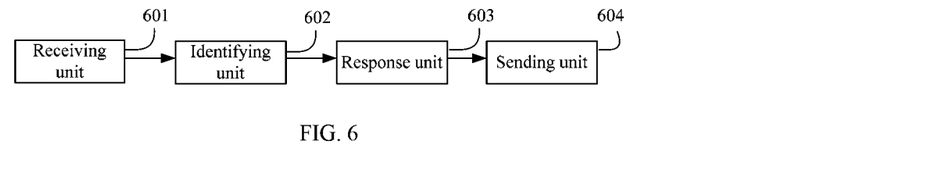
FIG. 6 is a schematic diagram of a call identifying apparatus according to an embodiment of the present invention.

Correspondingly, an embodiment of the present invention further provides a call identifying apparatus. FIG. 6 is a schematic diagram of the call identifying apparatus according to this embodiment of the present invention. As shown in FIG. 6, this embodiment includes the following units:

A receiving unit 601, configured to receive an Invite message sent by an IP multimedia subsystem IMS network element, where the Invite message carries called identifying information; and transmit the called identifying information to the identifying unit.

When a calling terminal initiates a voice call request to a called terminal, a corresponding network device, for example, the IMS network element, may receive a signaling message and send the signaling message to the IMS network element. After receiving a call signaling message corresponding to the calling terminal, the IMS network element extracts the called identifying information of the called terminal from the call signaling message. In this embodiment of the present invention, the IMS network element is defined synoptically and used to indicate a network element in an IMS network. For example, the IMS network element sending the Invite message to an MGCF entity is a BGCF entity. The BGCF entity is a part of the IMS network, mainly implements a call routing function, and is used to select a network that is connected to an entry point of a CS domain.

After extracting the called identifying information of the called terminal from the call signaling message sent by a calling terminal and determining that the called terminal corresponding to the called identifying information is a CS user terminal, the IMS network element may send the Invite message to the MGCF. The Invite message carries the called identifying information, calling identifying information, and call identifying information. The call identifying information is an identifier Call-ID that is used in the IMS network and used to identify a session in the SIP protocol.

A identifying unit 602, configured to receive the called identifying information transmitted by the receiving unit; when the called terminal identified by the called identifying information is a circuit switched CS network user, generate a CS call reference CR parameter or global call reference GCR parameter; and transmit the CR parameter or the GCR parameter to the sending unit and the response unit.

Specifically, a SIP message is used for information interaction between the MGCF entity and the IMS network element. To enable the IMS network element to use call identifying information same as that of a CS network side to identify a call, the MGCF entity may include the CR parameter or the GCR parameter in a response message to be returned to the IMS network element. The CR parameter or the GCR parameter is call identifying information used to identify a call in a CS network.

A CS call reference header field may be generated according to the CR parameter and/or the GCR parameter, and a format of the CS call reference header field may be as follows:

CS-Call-Reference: gcr=xxxxxxx; cr=yyyyyyy; crf=zzzzzzz;

where gcr is a GCR parameter, xxxxxxx is content of the GCR parameter, and a length of the content is equivalent to a character length of GCR content in a CS network; cr is a CR parameter, yyyyyyy is content of the CR parameter, and a length of the content is equivalent to a character length of the content of the CR parameter in the CS network; and crf is a protocol indication parameter, and zzzzzzz is a value of crf, which may be BICC, ITUISUP, or ANSIISUP.

Specifically, to implement the technical solution of the present invention, the MGCF entity needs to store a configuration information table, which stores a mapping relationship between an outgoing signaling type and a to-be-used CR parameter or GCR parameter. By querying configuration information in the configuration information table, the MGCF entity may determine whether the generated CS call header field carries a CR parameter or a GCR parameter. Certainly, when a CS network side uses BICC signaling, the MGCF needs to query corresponding configuration information, so as to select to use the GCR parameter or the CR parameter; and when the CS network side uses ITU-T ISUP signaling and ANSI ISUP signaling, the CR parameter is used to identify a call.

A response unit 603, configured to receive the CR parameter or the GCR parameter sent by the identifying unit, generate the CS call reference header field according to the CR parameter or the GCR parameter, and send the response message to the IMS network element, where the response message carries the CS call reference header field that is used to identify a call corresponding to the Invite message.

When the Invite message carries 100Rel information, the response unit 603 is specifically configured to send a 180/181/182/183/200 message to the IMS network element, where the 180/181/182/183/200 message carries the CS call reference header field.

When the Invite message does not carry the 100Rel information, the response unit 603 is specifically configured to: after receiving an address complete message ACM sent by a CS network element, send a 180 message to the IMS network element, where the 180 message carries the CS call reference header field; or after receiving an answer message ANM/CONNECT sent by the CS network element, send a 200 message to the IMS network element, where the 200 message carries the CS call reference header field.

A sending unit 604, configured to receive the CR parameter or the GCR parameter sent by the identifying unit, and send an initial address message IAM to the CS network element, where the IAM carries the CR parameter or the GCR parameter generated by the identifying unit.

Therefore, after receiving the response message returned by the MGCF entity, the IMS network element may record and store the CR parameter or the GCR parameter of the CS call reference header field as identifying information for identifying the call, thereby implementing that a call reference parameter consistent with that of the CS network side is used to identify a cross-domain call and facilitating interconnection and interworking between different networks. Subsequently, when charging is performed for the call, call charging can be performed by using the unified call reference parameter, thereby simplifying a cross-domain call charging method.

Figure 7:
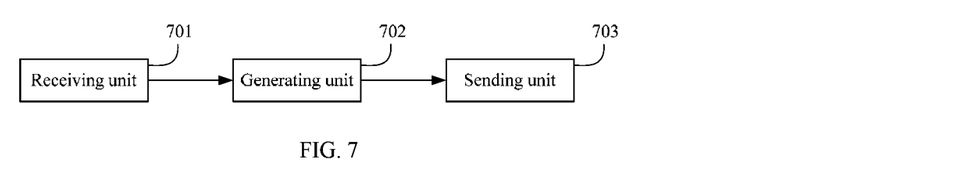
FIG. 7 is a schematic diagram of another call identifying apparatus according to an embodiment of the present invention.

Correspondingly, an embodiment of the present invention further provides a call identifying apparatus. FIG. 7 is a schematic diagram of another call identifying apparatus according to this embodiment of the present invention. As shown in FIG. 7, this embodiment includes the following units:

A receiving unit 701, configured to receive an initial address message IAM sent by a circuit switched CS network element and transmit the IAM to the generating unit.

When a calling terminal in a CS network initiates a call to a called terminal located in an IMS network, a corresponding network device, for example, the CS network element, may receive a signaling message; after receiving the signaling message, the CS network element determines, according to called identifying information carried in the signaling message, that the called terminal is located in the IMS network, and sends the IAM to an MGCF entity, where the message carries a call reference parameter CR or a global call reference parameter GCR that is used to identify the call.

A generating unit 702, configured to receive the IAM sent by the receiving unit, extract the call reference CR parameter or the global call reference GCR parameter from the IAM, generate a CS call reference header field according to the CR parameter or the GCR parameter, and transmit the CS call reference header field to the sending unit.

After extracting the CR parameter or the GCR parameter from the IAM, the MGCF entity may generate the CS call reference header field according to the parameter.

Specifically, a format of the CS call reference header field may be as follows:

CS-Call-Reference: gcr=xxxxxxx; cr=yyyyyyy; crf=zzzzzzz;

where gcr is a GCR parameter, xxxxxxx is content of the GCR parameter, and a length of the content is equivalent to a character length of GCR content in a CS network; cr is a CR parameter, yyyyyyy is content of the CR parameter, and a length of the content is equivalent to a character length of the content of the CR parameter in the CS network; and crf is a protocol indication parameter, and zzzzzzz is a value of crf, which may be BICC, ITUISUP, or ANSIISUP.

In the CS call reference header field, the parameter crf is optional.

Specifically, to implement the technical solution of the present invention, the MGCF entity needs to store a configuration information table, which stores a mapping relationship between an outgoing signaling type and a to-be-used CR parameter or GCR parameter. By querying configuration information in the configuration information table, the MGCF entity may determine whether the generated CS call header field carries a CR parameter or a GCR parameter. Certainly, when a CS network side uses BICC signaling, the MGCF needs to query corresponding configuration information, so as to select to use the GCR parameter or the CR parameter; and when the CS network side uses ITU-T ISUP signaling and ANSI ISUP signaling, the CR parameter is used to identify a call.

A sending unit 703, configured to receive the CS call reference header field transmitted by the generating unit, and send an Invite message to an IP multimedia subsystem IMS network element, where the Invite message carries the CS call reference header field that is used to identify a call corresponding to the IAM.

After the CS call reference header field is generated, the MGCF may include the CS call reference header field in the Invite message to be sent to the IMS network element, where the CS call reference header field is used to identify the call corresponding to the call signaling message.

Therefore, after receiving the Invite message sent by the MGCF entity, the IMS network element may record and store the CR parameter or the GCR parameter of the CS call reference header field as identifying information for identifying the call, thereby implementing that a call reference parameter consistent with that of the CS network side is used to identify a cross-domain call and facilitating interconnection and interworking between different networks. Subsequently, when charging is performed for the call, call charging can be performed by using the unified call reference parameter, thereby simplifying a cross-domain call charging method.

Figure 8:
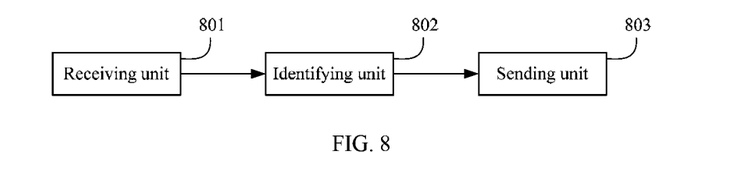
FIG. 8 is a schematic diagram of another call identifying apparatus according to an embodiment of the present invention.

Correspondingly, an embodiment of the present invention further provides a call identifying apparatus. FIG. 8 is a schematic diagram of another call identifying apparatus according to this embodiment of the present invention. As shown in FIG. 8, this embodiment includes the following units:

A receiving unit 801, configured to receive a call signaling message sent by a calling terminal, where the call signaling message carries called identifying information; transmit the called identifying information to the identifying unit; and transmit the call signaling message to a processing unit.

A identifying unit 802, configured to receive the called identifying information sent by the receiving unit; identify, according to the called identifying information, that a called terminal identified by the called identifying information is a circuit switched CS network user, and generate a first CS call reference header field; and send the CS call reference header field to the sending unit.

After receiving the call signaling message sent by the calling terminal, an IMS network element extracts the called identifying information from the call signaling message and may generate one CS call reference header field after determining, according to the called identifying information, that the called terminal is a CS user terminal.

A format of the CS call reference header field may be as follows:

CS-Call-Reference: gcr=xxxxxxx; cr=yyyyyyy; crf=zzzzzzz;

where gcr is a GCR parameter, xxxxxxx is content of the GCR parameter, and a length of the content is equivalent to a character length of GCR content in a CS network; cr is a CR parameter, yyyyyyy is content of the CR parameter, and a length of the content is equivalent to a character length of the content of the CR parameter in the CS network; and crf is a protocol indication parameter, and zzzzzzz is a value of crf, which may be BICC, ITUISUP, or ANSIISUP.

In the CS call reference header field, the parameter crf is optional.

A sending unit 803, configured to receive the first CS call reference header field transmitted by the identifying unit, and send an Invite message to a media gateway control function MGCF entity, so that the MGCF entity includes a second CS call reference header field in a to-be-returned response message, the second CS call reference header field is used to identify a call corresponding to the call signaling message, and the second CS call reference header field is generated by the MGCF entity according to the first CS call reference header field and configuration information.

After generating the first CS call reference header field, the IMS network element may include the first CS call reference header field in the Invite message to be sent to the MGCF entity, so that the MGCF entity generates the second CS call reference header field according to the first CS call reference header field after receiving the Invite message. Specifically, the first CS call reference header field may carry both the GCR parameter and the CR parameter. However, in an IAM to be sent to a CS network element, only a GCR parameter or a CR parameter of a specified type may be used according to a protocol used on a CS network side, and the second CS call reference header field is generated according to a to-be-used GCR parameter or CR parameter. When the response message is returned to the IMS network element, the response message may carry the second CS call reference header field, so that the IMS network element learns identifying information used by the CS network side in the call.

Specifically, the MGCF entity determines, according to an outgoing signaling type, whether the CR parameter or the GCR parameter is used in the second CS call reference header field. To implement the technical solution of the present invention, the MGCF entity needs to store a configuration information table, which stores a mapping relationship between an outgoing signaling type and a to-be-used CR parameter or GCR parameter. By querying configuration information in the configuration information table, the MGCF entity may determine whether the generated CS call header field carries a CR parameter or a GCR parameter. Certainly, when the CS network side uses BICC signaling, the MGCF needs to query corresponding configuration information, so as to select to use the GCR parameter or the CR parameter; and when the CS network side uses ITU-T ISUP signaling and ANSI ISUP signaling, the CR parameter is used to identify a call.

Therefore, the IMS network element can use a call reference parameter consistent with that of a CS network side to identify a cross-domain call, thereby facilitating interconnection and interworking between different networks; and subsequently, when charging is performed for the call, call charging can be performed by using the unified call reference parameter, thereby simplifying a cross-domain call charging method.

Figure 9:
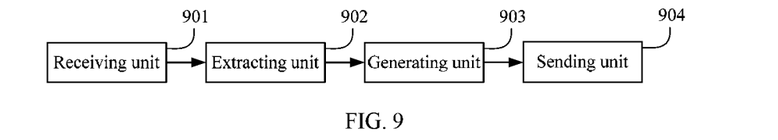
FIG. 9 is a schematic diagram of another call identifying apparatus according to an embodiment of the present invention.

Correspondingly, an embodiment of the present invention further provides a call identifying apparatus. FIG. 9 is a schematic diagram of another call identifying apparatus according to this embodiment of the present invention. As shown in FIG. 9, this embodiment includes the following units:

A receiving unit 901, configured to receive an Invite message sent by an IP multimedia subsystem IMS network element, where the Invite message carries a first circuit switched CS call reference header field; and transmit the first CS call reference header field to the extracting unit.

When a calling terminal initiates a voice call request to a called terminal, a corresponding network device, for example, the IMS network element, may receive a signaling message and send the signaling message to the IMS network element. After receiving a call signaling message corresponding to the calling terminal, the IMS network element extracts called identifying information of the called terminal from the call signaling message.

After extracting the called identifying information of the called terminal from the call signaling message sent by a calling terminal and determining that the called terminal corresponding to the called identifying information is a CS user terminal, the IMS network element may send the Invite message to an MGCF. The Invite message carries the called identifying information and includes a header field CS call reference header field. The CS call reference header field is generated by the IMS network element according to the called identifying information.

A format of the CS call reference header field may be as follows:

CS-Call-Reference: gcr=xxxxxxx; cr=yyyyyyy; crf=zzzzzzz;

where gcr is a GCR parameter, xxxxxxx is content of the GCR parameter, and a length of the content is equivalent to a character length of GCR content in a CS network; cr is a CR parameter, yyyyyyy is content of the CR parameter, and a length of the content is equivalent to a character length of the content of the CR parameter in the CS network; and crf is a protocol indication parameter, and zzzzzzz is a value of crf, which may be BICC, ITUISUP, or ANSIISUP.

In the CS call reference header field, the parameter crf is optional.

A extracting unit 902, configured to receive the first CS call reference header field sent by the receiving unit, extract the call reference CR parameter and/or the global call reference GCR parameter from the first CS call reference header field, and transmit the CR parameter and/or the GCR parameter to the generating unit.

A generating unit 903, configured to receive the CR parameter and/or the GCR parameter sent by the extracting unit; generate a second CS call reference header field according to the first CS call reference header field and configuration information, where the second CS call reference header field carries the CR parameter or the GCR parameter; and transmit the second CS call reference header field to the sending unit.

Specifically, the MGCF entity determines, according to an outgoing signaling type, whether the CR parameter or the GCR parameter is used in the second CS call reference header field. To implement the technical solution of the present invention, the MGCF entity needs to store a configuration information table, which stores a mapping relationship between an outgoing signaling type and a to-be-used CR parameter or GCR parameter is stored. By querying configuration information in the configuration information table, the MGCF entity may determine whether the generated CS call header field carries a CR parameter or a GCR parameter. Certainly, when a CS network side uses BICC signaling, the MGCF needs to query corresponding configuration information, so as to select to use the GCR parameter or the CR parameter; and when the CS network side uses ITU-T ISUP signaling and ANSI ISUP signaling, the CR parameter is used to identify a call.

A sending unit 904, configured to receive the second CS call reference header field sent by the generating unit, and return a response message to the IMS network element, where the response message carries the second CS call reference header field that is used to identify a call corresponding to the call signaling message.

When the Invite message carries 100Rel information, the sending unit 904 is specifically configured to send a 180/181/182/183/200 message to the IMS network element, where the 180/181/182/183/200 message carries the second CS call reference header field.

When the Invite message does not carry the 100Rel information, the sending unit 904 is specifically configured to: after receiving an address complete message ACM sent by a CS network element, send a 180 message to the IMS network element, where the 180 message carries the second CS call reference header field; or after receiving an answer message ANM/CONNECT sent by a CS network element, send a 200 message to the IMS network element, where the 200 message carries the second CS call reference header field.

In a case in which the MGCF does not support 100Rel, the 180 message may not carry the CS call reference header field, and therefore the 200 message needs to carry the CS call reference header field. Optionally, as an unconventional option, only the 180 message may carry the second call reference header field, and the 200 message does not carry the CS call reference header field.

Therefore, after receiving the response message returned by the MGCF entity, the IMS network element can know identifying information used by a CS network side in the call and can record and store the information as identifying information for identifying the call, that is, using a call reference parameter consistent with that of the CS network side to identify a cross-domain call. In addition, call charging can be performed by using the unified call reference parameter, thereby simplifying a cross-domain call charging method.

Figure 10:
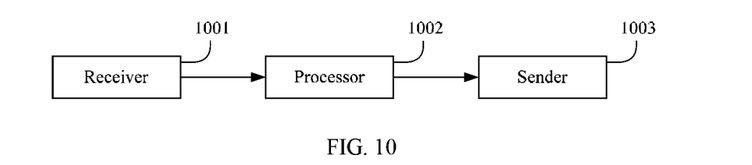
FIG. 10 is a schematic diagram of an MGCF according to an embodiment of the present invention.

Correspondingly, an embodiment of the present invention provides an MGCF entity. FIG. 10 is a schematic diagram of an MGCF according to this embodiment of the present invention. As shown in FIG. 10, this embodiment includes the following components:

A receiver 1001, configured to receive an Invite message sent by an IP multimedia subsystem IMS network element, where the Invite message carries called identifying information.

A processor 1002, configured to: when a called terminal identified by the called identifying information is a circuit switched CS network user, generate a CS call reference CR parameter or global call reference GCR parameter, so as to include the CR parameter or the GCR parameter in an initial address message IAM to be sent to a CS network element.

After receiving the Invite message, the MGCF entity performs routing according to the called identifying information and generates the GCR parameter or the CR parameter.

Specifically, a SIP message is used for information interaction between the MGCF entity and the IMS network element. To enable the IMS network element to use call identifying information same as that of a CS network side to identify a call, the MGCF entity may include the CR parameter or the GCR parameter in a response message to be returned to the IMS network element. The CR parameter or the GCR parameter is call identifying information used to identify a call in a CS network.

One CS call reference header field may be generated according to the CR parameter or the GCR parameter, and a format of the CS call reference header field may be as follows:

CS-Call-Reference: gcr=xxxxxxx; cr=yyyyyy; crf=zzzzzzz;

where gcr is a GCR parameter, xxxxxxx is content of the GCR parameter, and a length of the content is equivalent to a character length of GCR content in a CS network; cr is a CR parameter, yyyyyy is content of the CR parameter, and a length of the content is equivalent to a character length of the content of the CR parameter in the CS network; and crf is a protocol indication parameter, and zzzzzzz is a value of crf, which may be BICC, ITUISUP, or ANSIISUP.

In the CS call reference header field, the parameter crf is optional.

Specifically, to implement the technical solution of the present invention, the MGCF entity needs to store a configuration information table, which stores a mapping relationship between an outgoing signaling type and a to-be-used CR parameter or GCR parameter. By querying configuration information in the configuration information table, the MGCF entity may determine whether the generated CS call header field carries a CR parameter or a GCR parameter. Certainly, when a CS network side uses BICC signaling, the MGCF needs to query corresponding configuration information, so as to select to use the GCR parameter or the CR parameter; and when the CS network side uses ITU-T ISUP signaling and ANSI ISUP signaling, the CR parameter is used to identify a call.

A sender 1003, configured to generate a CS call reference header field according to the CR parameter or the GCR parameter, so as to include the CS call reference header field in the response message to be sent to the IMS network element, so that the IMS network element uses the CR parameter or the GCR parameter in the CS call reference header field to identify a call corresponding to the Invite message.

When the Invite message carries 100Rel information, the sender 1003 is specifically configured to: send a 180/181/182/183/200 message to the IMS network element, where the 180/181/182/183/200 message carries the CS call reference header field.

When the Invite message does not carry the 100Rel information, the sender 1003 is specifically configured to: after receiving an address complete message ACM sent by the CS network element, send a 180 message to the IMS network element, where the 180 message carries the CS call reference header field; or after receiving an answer message ANM/CONNECT sent by the CS network element, send a 200 message to the IMS network element, where the 200 message carries the CS call reference header field.

In a case in which the MGCF does not support 100Rel, the 180 message may not carry the CS call reference header field, and therefore the 200 message needs to carry the CS call reference header field. Optionally, as an unconventional option, only the 180 message may carry the CS call reference header field, and the 200 message does not carry the CS call reference header field.

In this embodiment of the present invention, an MGCF entity receives an Invite message sent by an IMS network element, where the Invite message carries call identifying information and called identifying information; generates a call reference CR parameter and/or a global call reference GCR parameter according to the called identifying information; and generates a CS call reference header field according to the CR parameter and/or the GCR parameter and sends a response message to the IMS network element, where the response message carries the CS call reference header field that is used to identify a call corresponding to the call signaling message. Therefore, the IMS network element can use a call reference parameter consistent with that of a CS network side to identify a cross-domain call, and subsequently, when charging is performed for the call, call charging can be performed by using the unified call reference parameter, thereby simplifying a cross-domain call charging method.

Figure 11:
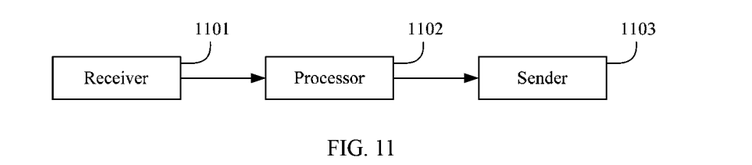
FIG. 11 is a schematic diagram of another MGCF according to an embodiment of the present invention.

The foregoing embodiment describes an apparatus for performing cross-domain call association by an MGCF entity in a scenario in which a calling terminal is located in an IMS network and a called terminal is located in a CS network. The following embodiment describes an apparatus for performing cross-domain call association by an MGCF entity in a scenario in which a calling terminal is located in a CS network and a called terminal is located in an IMS network. FIG. 11 is a schematic diagram of another MGCF according to an embodiment of the present invention. As shown in FIG. 11, this embodiment includes the following components:

A receiver 1101, configured to receive an initial address message IAM sent by a circuit switched CS network element.

A processor 1102, configured to extract a call reference CR parameter or a global call reference GCR parameter from the IAM, and generate a CS call reference header field according to the CR parameter or the GCR parameter.

After extracting the CR parameter or the GCR parameter from the IAM, the MGCF entity may generate the CS call reference header field according to the parameter.

Specifically, a format of the CS call reference header field may be as follows:

CS-Call-Reference: gcr=xxxxxxx; cr=yyyyyyy; crf=zzzzzzz;

where gcr is a GCR parameter, xxxxxxx is content of the GCR parameter, and a length of the content is equivalent to a character length of GCR content in a CS network; cr is a CR parameter, yyyyyyy is content of the CR parameter, and a length of the content is equivalent to a character length of the content of the CR parameter in the CS network; and crf is a protocol indication parameter, and zzzzzzz is a value of crf, which may be BICC, ITUISUP or ANSIISUP.

In the CS call reference header field, the parameter crf is optional.

Specifically, to implement the technical solution of the present invention, the MGCF entity needs to store a configuration information table, which stores a mapping relationship between an outgoing signaling type and a to-be-used CR parameter or GCR parameter. By querying configuration information in the configuration information table, the MGCF entity may determine whether the generated CS call header field carries a CR parameter or a GCR parameter. Certainly, when a CS network side uses BICC signaling, the MGCF needs to query corresponding configuration information, so as to select to use the GCR parameter or the CR parameter; and when the CS network side uses ITU-T ISUP signaling and ANSI ISUP signaling, the CR parameter is used to identify a call.

Certainly, a new header field may not be extended in a SIP message; instead, an existing header field of the SIP message carries the CR parameter and/or the GCR parameter.

A sender 1103, configured to send an Invite message to an IP multimedia subsystem IMS network element, where the Invite message carries the CS call reference header field that is used to identify a call corresponding to the IAM.

After the CS call reference header field is generated, the MGCF may include the CS call reference header field in the Invite message to be sent to the IMS network element, where the CS call reference header field is used to identify the call corresponding to the call signaling message.

Therefore, after receiving the Invite message sent by the MGCF entity, the IMS network element may record and store the CR parameter or the GCR parameter of the CS call reference header field as identifying information for identifying the call, thereby implementing that a call reference parameter consistent with that of the CS network side is used to identify a cross-domain call and facilitating interconnection and interworking between different networks. Subsequently, when charging is performed for the call, call charging can be performed by using the unified call reference parameter, thereby simplifying a cross-domain call charging method.

In this embodiment of the present invention, an MGCF entity receives an IAM sent by a CS network element; extracts a call reference CR parameter or a global call reference GCR parameter from the IAM and generates a CS call reference header field according to the CR parameter or the GCR parameter; and sends an Invite message to an IP multimedia subsystem IMS network element, where the Invite message carries the CS call reference header field that is used to identify a call corresponding to the call signaling message. Therefore, the IMS network element can use a call reference parameter consistent with that of a CS network side to identify a cross-domain call, and subsequently, when charging is performed for the call, call charging can be performed by using the unified call reference parameter, thereby simplifying a cross-domain call charging method.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

Steps of methods or algorithms described in the embodiments disclosed in this specification may be implemented by hardware, a software module executed by a processor, or a combination thereof. The software module may be configured in a random access memory (RAM), a memory, a read-only memory (ROM), an electrically programmable ROM, an electrically erasable programmable ROM, a register, a hard disk, a removable disk, a CD-ROM, or any other form of storage medium known in the art.

In the foregoing specific implementations, the objective, technical solutions, and benefits of the present invention are further described in detail. It should be understood that the foregoing descriptions are merely specific implementations of the present invention, but are not intended to limit the protection scope of the present invention. Any modification, equivalent replacement, or improvement made without departing from the spirit and principle of the present invention should fall within the protection scope of the present invention.

The invention claimed is:

1. A call identifying method, comprising:
receiving an Invite message sent by an IP multimedia subsystem (IMS) network element, wherein the Invite message carries called identifying information;
when a called terminal identified by the called identifying information is a circuit switched (CS) network user, generating a CS call reference (CR) parameter or global call reference (GCR) parameter, so as to carry the CR parameter or the GCR parameter in an initial address message (IAM) to be sent to a CS network element; and
generating a CS call reference header field according to the CR parameter or the GCR parameter, and sending a response message to the IMS network element, wherein the response message carries the CS call reference header field that is used to identify a call corresponding to the Invite message;

wherein the CS call reference header field further comprises a protocol indication parameter which is used to indicate a protocol type used to define the CR parameter or the GCR parameter.

2. The call identifying method according to claim 1, wherein when the Invite message carries 100Rel information, the sending a response message to the IMS network element is specifically: sending a 180/181/182/183/200 message to the IMS network element, wherein the 180/181/182/183/200 message carries the CS call reference header field; and when the Invite message does not carry the 100Rel information, the sending a response message to the IMS network element is specifically: after receiving an address complete message ACM sent by the CS network element, sending a 180 message to the IMS network element, wherein the 180 message carries the CS call reference header field; or after receiving an answer message ANM/CONNECT sent by the CS network element, sending a 200 message to the IMS network element, wherein the 200 message carries the CS call reference header field.

3. A call identifying method, comprising:

receiving an initial address message (IAM) sent by a circuit switched (CS) network element;

extracting a call reference (CR) parameter or a global call reference (GCR) parameter from the IAM, and generating a CS call reference header field according to the CR parameter or the GCR parameter; and sending an Invite message to an IP multimedia subsystem (IMS) network element, wherein the Invite message carries the CS call reference header field that is used to identify a call corresponding to the IAM;

wherein the CS call reference header field further comprises a protocol indication parameter which is used to indicate a protocol type used to define the CR parameter or the GCR parameter.

4. The call identifying method according to claim 3, wherein when the Invite message carries 100Rel information, the CS call reference header field is sent to the IMS network element in a 180/181/182/183/200 message; and when the Invite message does not carry the 100Rel information, the CS call reference header field is sent to the IMS network element in a 180 message, after the CS network element sending an address complete message; or the CS call reference header field is sent to the IMS network element in a 200 message, after the CS network element sending an answer message ANM/CONNECT.

5. A call identifying apparatus, comprising:

a processor, and a memory coupled to the processor, having processor-executable instructions stored thereon, which when executed by the processor causes the processor to implement operations including:

receiving an Invite message sent by an IP multimedia subsystem (IMS) network element, wherein the Invite message carries called identifying information;

receiving the called identifying information; when a called terminal identified by the called identifying information is a circuit switched (CS) network user generating a CS call reference (CR) parameter or global call reference (GCR) parameter; and receiving the CR parameter or the GCR parameter, and sending an initial address message (IAM) to a CS network element, wherein the IAM comprises the generated CR parameter or the GCR parameter; and receiving the CR parameter or the GCR parameter, generating a CS call reference header field according to the CR parameter or the GCR parameter, and sending a response message to the IMS network element, wherein the response message carries the CS call reference header field that is used to identify a call corresponding to the Invite message;

wherein the CS call reference header field further comprises a protocol indication parameter which is used to indicate a protocol type used to define the CR parameter or the GCR parameter.

6. The call identifying apparatus according to claim 5, wherein when the Invite message carries 100Rel information, the operations further comprises: sending a 180/181/182/183/200 message to the IMS network element, wherein the 180/181/182/183/200 message carries the CS call reference header field; and when the Invite message does not carry the 100Rel information, the operations further comprises: after receiving an address complete message ACM sent by the CS network element, sending a 180 message to the IMS network element, wherein the 180 message carries the CS call reference header field; or after receiving an answer message ANM/CONNECT sent by the CS network element, sending a 200 message to the IMS network element, wherein the 200 message carries the CS call reference header field.

7. A call identifying apparatus, comprising:

a processor, and a memory coupled to the processor, having processor-executable instructions stored thereon, which when executed by the processor causes the processor to implement operations including:

receiving, an initial address message (IAM) sent by a circuit switched (CS) network element;

receiving, the IAM, extracting a call reference (CR) parameter or a global call reference (GCR) parameter from the IAM generating a CS call reference header field according to the CR parameter or the GCR parameter; and receiving, the CS call reference header field, and sending an Invite message to an IP multimedia subsystem (IMS) network element, wherein the Invite message carries the CS call reference header field that is used to identify a call corresponding to the IAM;

wherein the CS call reference header field further comprises a protocol indication parameter which is used to indicate a protocol type used to define the CR parameter or the GCR parameter.

8. The call identifying apparatus according to claim 7, wherein when the Invite message carries 100Rel information, the CS call reference header field is sent to the IMS network element in a 180/181/182/183/200 message; and when the Invite message does not carry the 100Rel information, the CS call reference header field is sent to the IMS network element in a 180 message, after the CS network element sending an address complete message; or the CS call reference header field is sent to the IMS network element in a 200 message, after the CS network element sending an answer message ANM/CONNECT.

* * * * *